United States Patent [19]

Fitzhugh

[11] 3,934,824
[45] Jan. 27, 1976

[54] IRRIGATION SYSTEM WATER EMITTER
[76] Inventor: Davis Fitzhugh, Raspberry Lane, Augusta, Ark. 72006
[22] Filed: June 17, 1974
[21] Appl. No.: 479,781

[52] U.S. Cl. ............... 239/534; 239/542; 138/42; 222/564
[51] Int. Cl.² ................................ B05B 15/00
[58] Field of Search ................... 222/420–422, 222/148–150, 491–494, 547, 564, 528, 529; 239/542, 534, 590.5; 138/40, 42, 44

[56] References Cited
UNITED STATES PATENTS

| | | | |
|---|---|---|---|
| 2,904,225 | 9/1959 | Earles, Jr. | 222/494 X |
| 3,093,273 | 6/1963 | Borah | 222/529 X |
| 3,298,577 | 1/1967 | Chlystun | 222/529 |
| 3,540,483 | 11/1970 | Rinkewich | 222/421 X |
| 3,779,468 | 12/1973 | Spencer | 239/542 |
| 3,804,334 | 4/1974 | Curry | 239/542 X |

FOREIGN PATENTS OR APPLICATIONS

| | | | |
|---|---|---|---|
| 1,218,966 | 12/1959 | France | 239/534 |

Primary Examiner—Robert B. Reeves
Assistant Examiner—Charles A. Marmor
Attorney, Agent, or Firm—Mandeville and Schweitzer

[57] ABSTRACT

A water emitter is provided for drip irrigation systems which can be modified at the irrigation site to accommodate variations in pressure in differing areas in the specific configuration or layout of system used, and the typography of the land to be irrigated. The emitter includes a flexible, collapsible thermoplastic or elastomeric emitter tube, having a plurality of spaced-apart crimps imparted thereto. The crimps serve to close the emitter tube when no water is supplied thereto, and to provide a sinuous path for water supplied to the emitter, thus increasing friction and controlling pressure at each emitter in the system. The length of each emitter and, therefore, the number of crimps can be selected according to the desired pressure at each emitter site along the system. Also included with each emitter is an elongated, relatively rigid protective tube to prevent soil compaction of the emitter in its collapsed non-functioning state.

3 Claims, 2 Drawing Figures

IRRIGATION SYSTEM WATER EMITTER

STATEMENT OF THE INVENTION

Generally, this invention relates to drip irrigation systems for irrigating cultivated land. More particularly, this invention relates to the construction of a water emitter utilized along a drip irrigation system, which emitter is comprised of a flexible, collapsible, elongated tube having a plurality of spaced-apart crimps imparted thereto to provide an emitter of a generally corrugated appearance. The emitter walls are relatively thin to provide a collapsed state for the emitter when no water is supplied thereto, and the spaced crimps therealong provide a sinuous path and increased friction and/or tension to water passing therethrough to control the water pressure in the drip irrigation system.

That is, the emitters may be first formulated of a length longer than that required for use of a specific emitter in its particular site along the system. Thereafter, upon installation of the emitter, and through appropriate calibrations, the length thereof may be varied according to measured pressures simply by cutting off a portion of the emitter to reduce the tension applied by the emitter to water passing therethrough, if the pressure in the system at the particular point where the emitter is to be installed is lower than that at another point. Conversely, if the water pressure is higher at that particular point in the system, a longer emitter may be installed to accommodate the higher pressure. Thus, when a plurality of such emitters, in accordance herewith, are installed in a system, differences in pressure caused by differences in length in the system from the water source and the typography of the land (its elevation and rolling nature) may be readily accommodated.

BACKGROUND OF THE INVENTION

In the last few years, drip irrigation has become increasingly popular as a substitute for other irrigation methods, such as sprinkler and furrow irrigation, in the irrigation of crops. Generally, drip irrigation comprises supplying a small volume of water frequently to the root area of plants and trees, and confining the water supplied substantially to such root areas. As a consequence, the drip irrigation systems are essentially underground, thus reducing the loss of water through evaporation. This is most important in those areas where water supplies are deficient because substantially smaller quantities of water can be used for maintaining and sustaining crops than would be the case with conventional furrow or ditch irrigation. Moreover, because the ground surface is not flooded with water, as is the case with conventional sprinkler and furrow irrigation, cultivating equipment may be run along the paths between the crops being tended at any time rather than at those times between irrigation, when the irrigation ditches are free of water and mud.

Generally, such a drip irrigation system includes a main supply line connected to a supply of water under pressure, the main supply line being of such size as to carry all the water required for the system at a desired pressure and without undue fluid frictional losses. Usually with such systems, there will be connected to the main supply line, a plurality of feeder lines spaced along the main supply line at desired intervals, and depending upon the configuration of the plot of land being irrigated, for conveying water from the main supply line along crop or tree rows, the feeder tubes being flexible or rigid, and each being a relatively small diameter as compared to the main supply line, to carry a volume of water desired to be distributed therethrough without undue fluid frictional losses.

Spaced along each feeder tube are a plurality of water emitters, each being designed to distribute water from the feeder tube to a specific plant root area in a desired and uniform volume at frequent intervals. Conventional prior art emitters on the market have been comprised of a variety of forms, most being designed to supply water from about 0.5 to about 4 gallons of water per hour, per emitter. In its simplest form, emitters may be simply a flexible tubing of very small diameter or more intricate valving arrangements, including filters and the like. One of the difficulties with emitters produced in the past, and a common difficulty of drip irrigation systems, is the fact that the emitters become clogged, not only by soil compacted around the exit orifice of the emitters, which either clogs the orifice or jams the functioning of the valves for the emitter, but from sediment or minerals in the water supply itself. In any one particular system, the emitters are generally of the same construction, so that the emitters do not provide for or accommodate differences in pressure fluctuation in different areas of the particular drip irrigation system. Since some systems will be installed in land having a rolling typography, it will be understood that pressures will fluctuate in the main supply line as well as the feeder lines leading from the main supply line, thus causing variation in the quantity of water issuing from one emitter in the system as compared to another. Moreover, complicated valving arrangements in some emitters provide high initial cost which may be prohibitive, particularly in newly developing areas where it is most important to provide increased food production at as low a cost as possible.

DESCRIPTION OF THE INVENTION

With this invention, by contrast, water emitters are provided for drip irrigation systems which emitters are extremely inexpensive to produce and which accommodate at the installation site, fluctuations in pressure in the system caused by the observable conditions of typography in the system as it is being laid out, and the particular configuration of the system and the plot of land being irrigated. Moreover, the emitters herein, because of the nature of their construction, readily accommodate a purging action of each emitter to eliminate the difficulties in clogging which oridinarily attend drip irrigation systems.

This is achieved by providing elongated, relatively flexible, collapsible corrugated-like emitters for installation in spaced-apart fashion along a drip irrigation system. The emitters may be comprised of an elastomeric or thermoplastic material which has spaced-apart crimps therein imparted during the manufacture of the emitters. The emitters are very simple tube-like devices connected to some sort of relatively rigid head for insertion into the particular feeder line for the emitter. Because of the crimped and/or corrugated nature of the emitter, a sinuous path is provided for water supplied thereto, thus increasing the friction imparted to water passing therethrough, and accommodating the pressure in the feeder line connected with the particular emitter involved. Generally, the emitters will be comprised of a length longer than that required for each individual emitter in the system and being, perhaps, 12 or 15 inches in length, with the crimps therein spaced apart perhaps 1 inch. Thus, when the emitters are installed, and the user determines differences in pressure in the supply lines, depending upon the particular system and the typography of the land involved, he may shorten the emitter to reduce the pressure needed for water flowing therethrough, depending upon the pressure in the particular feeder feeding to the emitter being installed. Thus, longer emitters will be used in that portion of the system having higher pressures and shorter ones in that portion of the system having lower pressures.

Also included herewith with each emitter is a relatively rigid tube, which extends from the feeder line supplying the emitter and surrounds the emitter. Thus, when the emitter finishes feeding a supply of water and collapses, the protective cylinder surrounding the emitter will prevent soil compaction in its collapsed state, so that the emitter may again function when water is supplied to it.

Generally, the emitter diameter will be within the range of between about 0.25 to about 1.00 inches and the crimps spaced therealong will be approximately 1 inch. Moreover, with a tube of this size range, the water pressure required to cause the emitter to function properly will be in the number of pounds per square inch of emitter size per each crimp in the emitter. Thus, an 8 inch emitter will require 8 lbs. per square inch water pressure, while an emitter with 5 crimps will require 5 lbs. per square inch of pressure, assuming a diameter of 0.5 inches, for example.

Before describing this invention in more detail, it may be well to note that the materials useful for producing emitters, in accordance herewith, may be an elastomeric or thermoplastic material, including polystyrene, polyvinyl chloride, polyethylene, or such synthetic rubbers as butadiene-styrene copolymer. Preferably, the emitter will be comprised of a thermoplastic material which may be formed in its entirety and having imparted thereto, the crimped configuration of the emitter upon formation. The supply lines, feeder lines and the relatively rigid tube surrounding the emitter may also be of conventional thermoplastic materials utilized for such applications, such as polyvinyl chloride, polypropylene or polyethylene. Whether or not the particular item being produced is to be substantially flexible or rigid will be determined by the specific incorporation into the formulations for producing the articles and the quantity thereof of conventional stabilizers, plasticizers, fillers, pigment and so forth.

DETAILED DESCRIPTION OF THE INVENTION

Figure 1:
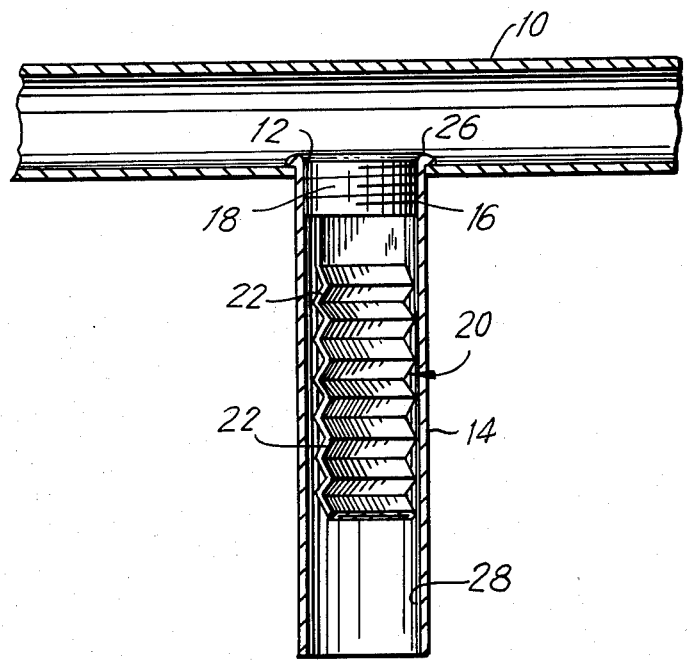
FIG. 1 is a longitudinal sectional view of a short section of feeder tubing, having an emitter of the invention installed therein.

Referring to the drawings in which like reference characters refer to like parts throughout the several views thereof, a feeder tubing 10 is shown. As discussed above, feeder tubing 10 will lead from a main supply line and a plurality of such feeder tubings will be extended from the main supply line and laid out in a pattern for distributing water over the specific plot of land being irrigated, all in well known manner. Spaced along each feeder tube 10 in such a system will be a plurality of orifices or bores 12 for accommodating a plurality of emitters in those specific areas where the water supply is specifically required in the land being irrigated. Inserted into bore 12 is a relatively rigid protective tubing 14 which may be press-fit into opening 12 by, for example, the formation of an annular beading 26 around the upper edge of tube 14. It should be understood, however, that tube 14 may be held in bore or opening 12 by the application of an appropriate adhesive or by the use of co-operating screw threads.

As shown in FIG. 1, the internal surface 28 of tube 14 may have screw threads 16 for accommodating the screw threads 28 of the head 18 of the emitter 20 of the invention. Thus, emitter 20 in its collapsed state will lie in a corrugated collapsed fashion inside protective tubing 14.

Figure 2:
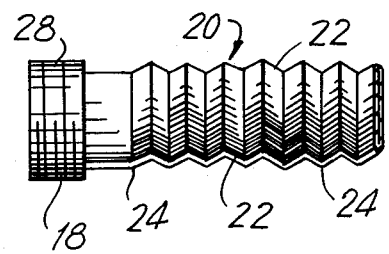
FIG. 2 is an enlarged perspective view of the emitter of the invention.

Referring to FIGS. 1 and 2, emitter 20 has imparted thereto, a plurality of crimps 24 therealong in order to provide the corrugated construction for emitter 20. Crimps 24 divide emitter 20 into a plurality of sections 22. Thus, upon water being supplied to emitter 20, the emitter expands under the pressure of the water and provides an internal sinuous path for the water passing therethrough. Depending upon the length of the emitter, and as a consequence, the number of crimps and sections 22 in any specific emitter, the pressure required in feeder line 10 to force passage of water through any individual emitter will vary. Thus, when the operator is laying out his line, he may readily observe and calculate which areas of his system have higher pressures, depending upon the rolling nature or flat nature of specific areas being irrigated and he can readily accommodate these fluctuations in pressure in his system by installing emitters of differing lengths, by taking the initial emitter and cutting off a portion thereof to shorten the emitter to accommodate lower pressures and to shorten the emitter still further for even lower pressures, particularly at the ends of the feeder lines and in those areas where feeder lines are traveling uphill. Obviously, higher pressures and longer emitters will be in that section of the system closest to the source of water supply.

In addition, because of the size of the flexible tube emitters, in accordance herewith, there is much less occasion when the emitters may be clogged with debris, either from the water supply itself or from adjacent soil around the exit orifice of each emitter. Nevertheless, because of the corrugated nature of the flexible emitter and the sinuous path which the water must follow upon being supplied to each emitter, there is an initial surging action upon water first entering each emitter as the corrugated emitter gradually expands to accommodate the water. This surging action serves to eject any sediment which may have collected in the emitter during the period of time immediately prior to the last portions of water fed to the emitter being forced out.

It will be understood by practitioners in the art, furthermore, that because of the relatively simple construction of the emitters, in accordance herewith, there is much less chance of breakdown of a system utilizing such emitters. Moreover, because of the simplified construction, the emitters are much less expensive to produce than as compared to, for example, prior art emitters utilizing complicated valving arrangements. Although all of the emitters produced are of the same construction, nevertheless because of that construction, the emitters may be utilized for accommodating different pressure differentials in different areas of an irrigation system, as discussed above. Thus, there is no need for producing emitters of different configuration and/or different size to accommodate different pressure differentials in different portions of a drip irrigation system.

It will be appreciated that because of the form of construction of the emitters herein, a variety of different materials may be utilized for the construction thereof, depending upon which materials are more readily available and which materials are the least expensive in any particular area where they may be produced. It will be understood, therefore, that the emitters in accordance with this invention are especially appropriate for use in areas which are extremely poor or just beginning initial development.

While the forms of apparatus herein described constitute preferred embodiments of the invention, it is to be understood that the invention is not limited to these precise forms of apparatus and that changes may be made therein without departing from the scope of the invention, which is defined in the appended claims.

What is claimed is:

1. A water emitter for connection with the longitudinal bore in feeder lines of a drip irrigation system for the distribution of water in said bore to surrounding soil; said emitter comprising
   a. a substantially rigid cylinder for attachment to a feeder line of a drip irrigation system;
   b. first means on said cylinder for connecting said cylinder to said bore in a feeder line of a drip irrigation system;
   c. a substantially rigid annular head;
   d. an elongated, flexible, collapsible tube with one end connected to said head;
   e. said tube having a plurality of spaced apart crimps disposed therealong to provide when expanded in internal sinuous path for water passing therethrough;
   f. opposed cooperating means in one end of said cylinder and on said head for holding said head and its connected tube in said cylinder;
   g. said cylinder surrounding said tube along substantially its entire length to protect said tube from surrounding soil in its collapsed state.

2. A water emitter as described in claim 1, in which
   a. said connecting means on said cylinder is an annular integral bead disposed at one end thereof for press-fitting engagement into said bore of a feeder line.

3. A water emitter as described in claim 1, in which
   a. said opposed cooperating means are cooperating screw threads.

* * * * *